May 4, 1948.     W. H. TEETER     2,440,986

PUMP

Filed March 6, 1943     3 Sheets-Sheet 1

INVENTOR.
Wilford H Teeter
BY Spencer Hardman and John
attorneys

May 4, 1948.  W. H. TEETER  2,440,986
PUMP
Filed March 6, 1943  3 Sheets-Sheet 2

INVENTOR.
BY Wilford H. Teeter
Spencer Hardman and Fisher
attorneys

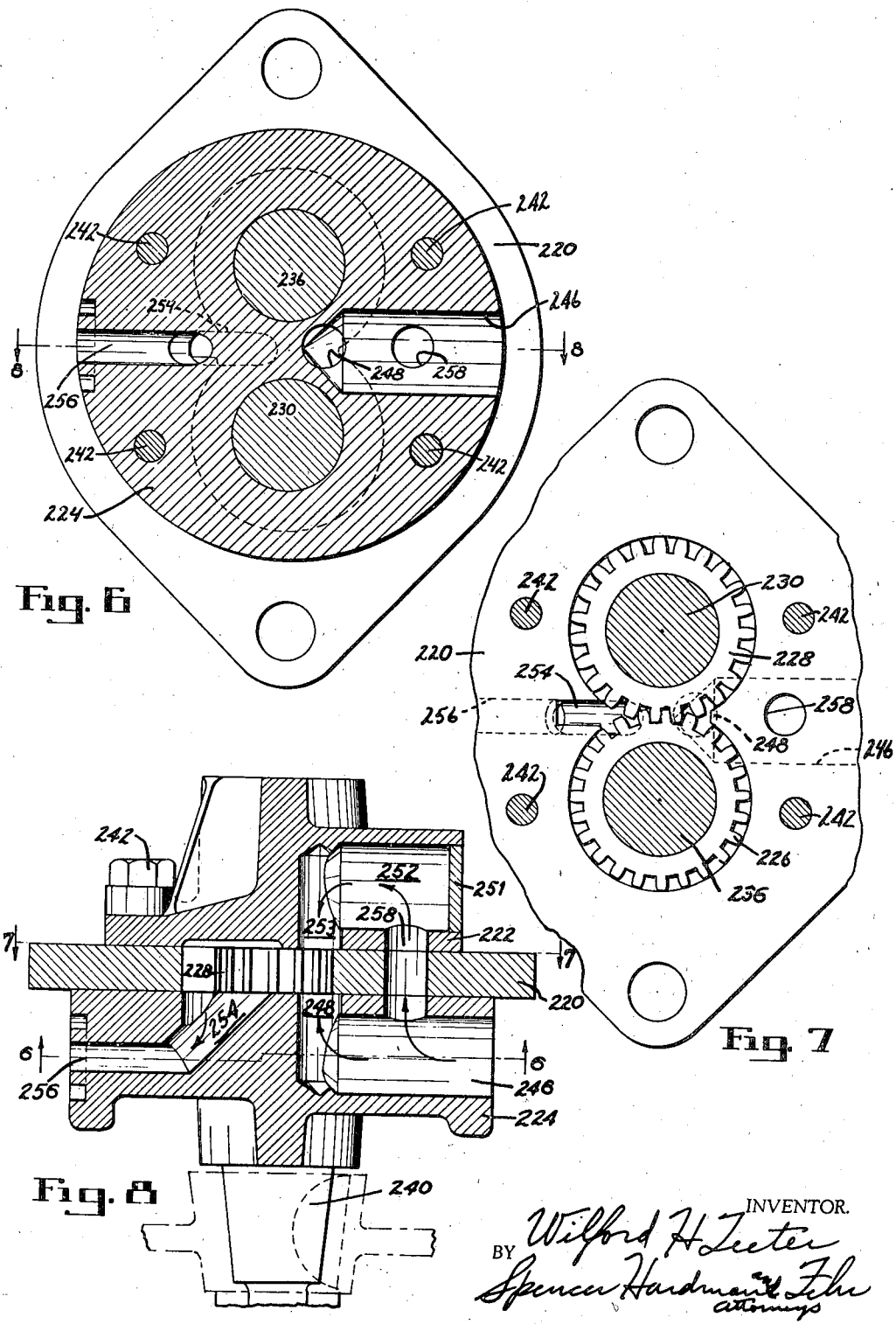

Patented May 4, 1948

2,440,986

UNITED STATES PATENT OFFICE 2,440,986

PUMP

Wilford H. Teeter, Dayton, Ohio, assignor to General Motors Corporation, Dayton, Ohio, a corporation of Delaware Application March 6, 1943, Serial No. 478,195

2 Claims. (Cl. 103—126)

This invention relates to gear and vane pumps for pumping against high pressures.

One of the obstacles to the use of gear and vane pumps in pumping against high pressures are the bearing failures apparently caused by the breaking down of lubrication due to excessive bearing loads. These bearing loads are concentrated mainly on the inlet side of each bearing.

It is an object of my invention to provide a simple pump with a simple means for preventing the breaking down of lubrication of the bearings.

It is another object of my invention to provide a simple pump with a simple means for increasing the load-carrying ability of the bearings.

It is another object of my invention to provide a simple pump with a simple means for cooling the bearings.

It is still another object of my invention to provide a simple gear pump with a simple means for concentrating the cooling of the bearings directly adjacent the points where the bearing load is concentrated.

These objects are attained by causing the fluid being drawn into the gears or vane spaces to first flow through passages directly in the bearing bosses. These passages extend along the bearings adjacent the points of the greatest concentration of the load on the inlet side of the pump. This keeps the lubricant sufficiently cool at the points of greatest concentration to preserve its film strength and lubricating qualities, thereby preventing a break-down of lubrication and preventing failure of the pump.

Further objects and advantages of the present invention will be apparent from the following description, reference being had to the accompanying drawings, wherein a preferred form of the present invention is clearly shown.

In the drawings:

Fig. 6 is a sectional view of a simple gear pump showing another form of my invention taken along the line 6—6 of Fig. 8;

Fig. 7 is a sectional view taken along the line 7—7 of Fig. 8; and

Fig. 8 is a sectional view taken along the line 8—8 of Fig. 6.

Figure 1:
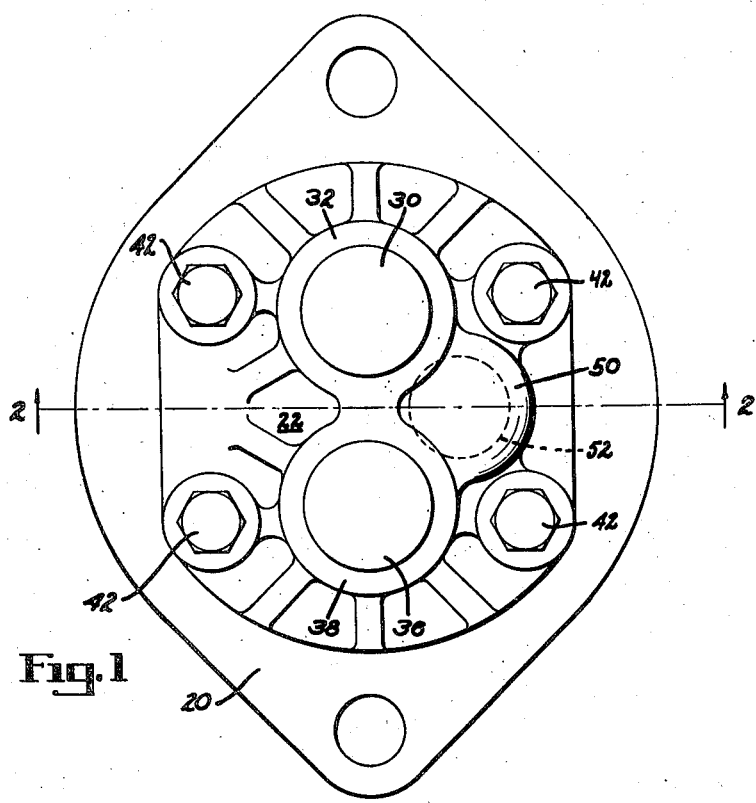
Fig. 1 is a plan view of a simple gear pump embodying one form of my invention.
Figure 2:
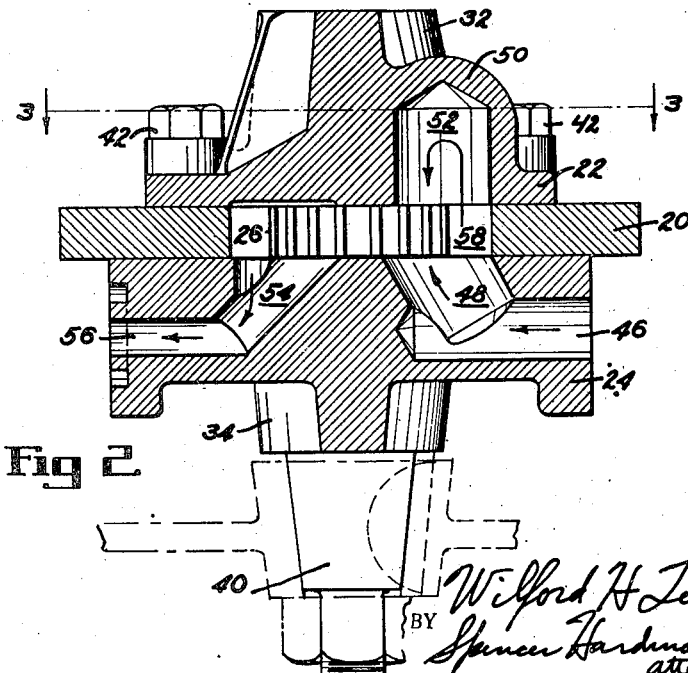
Fig. 2 is a sectional view taken along the line 2—2 of Fig. 1.
Figure 3:
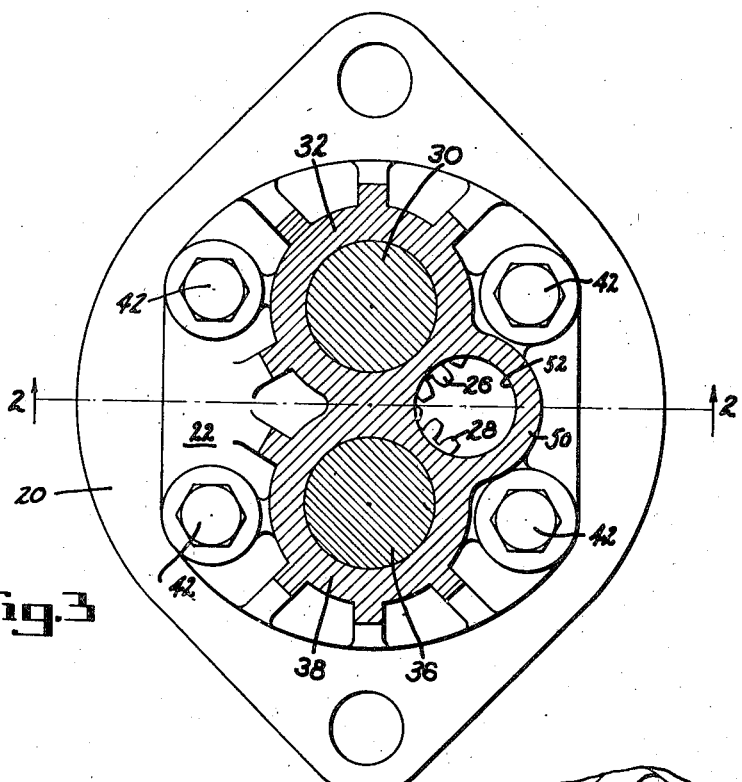
Fig. 3 is a sectional view taken along the line 3—3 of Fig. 2.

Referring now to the drawings and more particularly to Figs. 1 to 3, there is shown a simple gear pump made up of a cylinder plate 20, an upper body portion 22 and a lower body portion 24. The cylinder plate contains the intermeshing gears 26 and 28 which are supported by shaft ends extending into bearings provided by bearing bosses in the body members 22 and 24. For example, the gear 26 is rotatably supported on both sides by the shaft 30 mounted in the bearings provided in the bearing bosses 32 and 34 provided in body members 22 and 24 on either side of the cylinder plate 20. Likewise the gear 28 is supported by the shaft 36 in the bearing boss 38 upon one side of the gear 28 and is similarly supported in the body portion 24 upon the opposite side of the cylinder plate 20. The shaft means 36 is provided with an extension in the form of a standard tapered shaft fitting 40 for coupling to any suitable drive means. The body members 22 and 24 are clamped tightly to the cylinder plate 20 by suitable bolts 42.

Pumps of this general type are quite common and have been very often used for pumping liquids and particularly oils at moderate pressures for hydraulic systems as well as lubrication. They, however, have been considered unsuitable for high pressure work on account of the frequent bearing failures.

There have been many attempts to provide special bushings for the bearings to increase their load-carrying capacity, but I find that such bushings only tend to increase the difficulties and make the pump more complicated. I have found that the failures of the gear and vane type pumps, when used for pumping against high pressures, are due to the failure of lubrication because of the heavy bearing loads. This failure of lubrication I believe to be due to excessive heat at and adjacent the points of the greatest concentration of the load upon the bearings. Inasmuch as the load upon bearings is caused by the pressure of the fluid on the discharge side of the pump acting against the adjacent surfaces of the gears, the point of greatest concentration of the load of the bearings is upon the inlet side of the pump.

I have tried immersing the entire pump in the fluid being pumped but this failed to provide adequate cooling. I have discovered that by providing passages as close as possible to the portion of the bearing surfaces which carry the greatest load and causing the fluid being pumped to flow at a rapid rate through such passages, the pressures against which the pump operates may be doubled or tripled without bearing failures. In order to do this I prefer to make the entire body portion, namely the parts 22 and 24 entirely out of a suitable bearing material, for example, leaded bronze. Directly in this material along the bearings I form the inlet passage 46 by drilling and extend this passage inwardly until it is quite close to the bearing surfaces in both of the bearing bosses in the body portion 24. A second drilled passage 48 is drilled nearly vertically on the inlet side adjacent the point of meshing of the gears. These passages 46 and 48 therefore serve to cool the points of greatest concentration of the load in the body portion 24. In order to properly cool the points of greatest concentration of load of the bearings 32 and 38 in the body portion 22, I provide a boss 50 between the bearing bosses 32 and 38 on the inlet side of the body portion 22. Within this boss I drill a well 52 directly opposite the passage 48 and extending close to the bearing surfaces but without direct communication with them. Upon the opposite side of the pump, namely the high pressure side of the pump, I provide the discharge passages 54 and 56 in the body portion 24.

By this arrangement, the heat formed in the bearings is transmitted directly to the body portions 22 and 24 and into the fluid flowing through the passages therein. The fluid to be pumped enters the passage 46 and follows the arrows shown in Fig. 2. Some of the fluid to be pumped flows to the inner end of the passage 46 and along the inner side of the passage 48 nearest the bearings in the body portion 24 to cool the bearings sufficiently to preserve the film strength of the lubricant in the bearings to prevent the breaking down of lubrication and charring or burning of the lubricant and the destruction of the bearings.

Other portions of the lubricant being pumped flows from the passage 48 through the passage 58 provided in the cylinder plate 20 to the well 52 and thence circulates within the well 52 to cool the bearings 32 and 38 in the body portion 22 on the inlet side nearest their points of greatest concentration of load. This keeps the lubricant in the bearings 32 and 38 cool, thereby preserving its film strength and preventing breaking down of lubrication and consequent charring of the lubricant and destruction of the bearings.

The fluid to be pumped enters the spaces between the teeth of the gears from the passage 48 and the well 52 and also from the passage 58 in the cylinder plate 20. The fluid is then carried around the cylinder walls in the cylinder plate 20 in the usual manner to the discharge chamber which connects to the passage 54 and the discharge passage 56. I have found that this very simple pump provided with these passages and the well, as shown, increases several times the pressure against which this pump can operate without bearing failures.

Figures 4, 5:
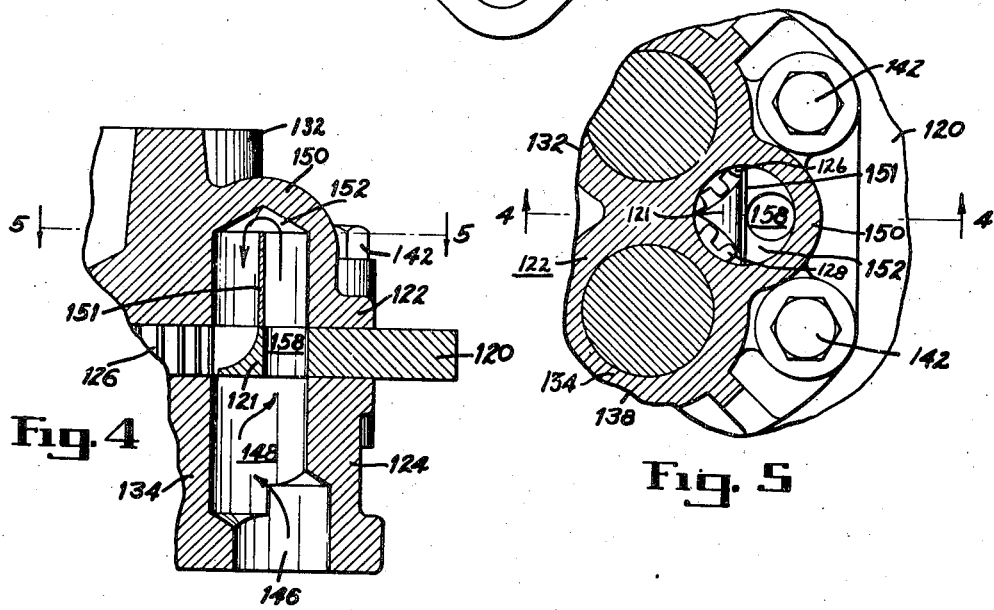
Fig. 4 is a fragmentary sectional view of a simple gear pump provided with another form of cooling passage for the bearings taken along the line 4—4 of Fig. 5.
Fig. 5 is a fragmentary sectional view taken along the line 5—5 of Fig. 4.

In Figs. 4 and 5 there is shown a modified form in which the passages are so arranged to provide more rapid flow and greater cooling of the bearings. In this form the inlet passage 146 is arranged in the bottom of the body portion 124 and connects directly with the passage 148 extending alongside the bearings 134 in the body portion 124. The cylinder plate 120 is held between the upper and lower body portions 122 and 124 by the bolts 142. It is provided with a passage 158 connecting to the interior cavity 152 of a boss 150 provided on the inlet side between the bearing bosses 132 and 138 in the body portion 122. The interior cavity 152 of the boss 150 is divided by a thin plate 151 extending from the cylinder plate 120 to a point near the upper end of the interior cavity 152. The interior cavity 152 is formed by a drill leaving a conical cavity in the upper portion of the boss 150 and the thin plate 151 stops short of this conical shaped end portion to allow flow from one side of the thin plate to the other. The cylinder plate 120 is provided with a web 121 which prevents the fluid to be pumped from flowing directly from the passage 148 into the gears 126 and 128. It is therefore necessary for the fluid to be pumped to flow as shown by the arrows from the passage 146 through the passage 148, the passage 158 and thence through the passage on the right side of the plate 151 to the other end of the interior cavity 152 and thence downwardly through the passage on the left side of the thin plate 151 to the space in between the gears 126 and 128 where it enters the spaces between the teeth of the gears and is carried around to the high pressure side of the pump. With this arrangement greater cooling may be obtained for the portion of the bearings adjacent the points of greatest concentration and the pump can pump against even higher pressures than the pump shown in Figs. 1 to 3.

In Figs. 6 to 8 is another form also capable of pumping against very high pressures. In this form the gears 226 and 228 and shafts 230 and 236 with the driving connection 240 and bolts 242 are substantially the same as shown in Figs. 1 to 3. The lower body 224 contains a large drilled inlet passage 246 extending to a vertical drilled passage 248 leading to the bottom-side of the gears just after the point where the teeth begin unmeshing. Another vertical passage 258 extends from the passage 246 directly through the cylinder plate 220 to a second drilled passage 252 having its open end closed by a plug 251. This second drilled passage in the upper body member 222 extends to a vertically drilled passage 253 extending to the sides of the gears 226 and 228 directly opposite the passage 248.

By this arrangement the fluid to be pumped flows in through the passage 246. This fluid divides and flows as shown by the arrows with substantially one-half flowing upwardly through the passage 258 to the passage 252 and thence downwardly through the passage 253 alongside the upper bearings to the point at which the fluid is taken in between the teeth of the gears. Substantially all of the remainder of the fluid continues onwardly through the passage 246 until it reaches the passage 248 and rises vertically to feed into the space between the teeth of the gears. The passages 248 and 253 are sufficiently small that all of the fluid cannot pass through either alone fast enough to keep the gears filled. In fact they should be sufficiently small that approximately half of the flow must go through each of the passages 253 and 248. The passage 258 should be made sufficiently large that the restriction through each path will be substantially the same and the fluid will feed through each of the paths in substantially equal quantity.

The fluid taken in by the gears will be discharged through the discharge passages 254 and 256. In this form, the cooling passages are substantially symmetrical and cool the bearings similarly in both the upper and lower body portions 222 and 224. These cooling passages are on the inlet side and sufficiently near that they will take enough of the heat away from the point of greatest concentration of pressure to prevent the excessive lowering of film strength which would permit failure of lubrication and consequent burning out of the bearings.

It will be noticed that in each of these pumps the parts are made as simple as possible and only five major elements, in addition to the bolts, pins and plugs, are required. These five parts, of course, are the cylinder plate with the upper and lower body portions and the two gears with their integral shaft portions. The fact that no bushings for the bearings are required increases the transfer of heat from the bearing surfaces through the walls to the cooling passages 248 and 253.

The bearings shown are lubricated by the fluid flowing through the pump, but where the fluid flowing through the pump has insufficient lubricating qualities a separate means for lubricating the bearings may be used. The cooling passages, of course, work just as well where a separate lubricating means is used for lubrication. Thus by the use of simple drilled passages and plug adequate cooling for the bearings is provided which makes it possible for the pump to operate against pressures which are several times as high as pumps without this feature can operate against. The cooling by the inlet passages may be applied in a similar manner to vane pumps.

While the form of embodiment of the invention as herein disclosed, constitutes a preferred form, it is to be understood that other forms might be adopted, as may come within the scope of the claims.

What is claimed is as follows:

1. A rotary pump including a set of intermeshing impellers, a housing receiving and surrounding said impellers, shaft means extending in opposite directions from each of said impellers for supporting the impellers in intermeshing relationship, bearing bosses including bearings receiving ends of the shaft means, two of said bosses on one side of said impellers being provided with another boss which is hollow and which has its axis substantially parallel and eccentric to the bearing bosses, said hollow boss being located completely at one side of a line extending between the axes of the shaft means and joining each of said two bearing bosses on one side thereof, the walls between the cavity in said hollow boss and each of the shaft means in the two bearing bosses being thinner than the remaining wall portions of the bearing bosses, said housing being provided with a fluid inlet passage upon the opposite side of said impeller means connecting with the cavity in said hollow boss and a fluid outlet passage.

2. A rotary pump including an impeller, a housing surrounding and receiving said impeller, shaft means extending from said impeller for supporting said impeller within the housing, said housing being provided with bearing means for said shaft means, said housing being also provided with a hollow boss having its axis extending parallel and eccentric to said shaft means for a distance at least substantially one half the length of the bearing means, the portion of the wall of the bearing means between the shaft means and the cavity in the hollow boss being thinner than the remaining portions of the bearing means, said housing being provided with a fluid inlet passage connecting with the cavity in said hollow boss, the cavity in said hollow boss connecting with said impeller, said housing being also provided with a fluid outlet.

WILFORD H. TEETER.

REFERENCES CITED

The following references are of record in the file of this patent:

UNITED STATES PATENTS

| Number | Name | Date |
|---|---|---|
| 323,993 | Wildern | Aug. 11, 1885 |
| 626,206 | Jasper | May 30, 1899 |
| 1,634,023 | Davison | June 28, 1927 |
| 1,769,153 | Meyer | July 1, 1930 |

FOREIGN PATENTS

| Number | Country | Date |
|---|---|---|
| 2,590 | Great Britain | 1880 |
| 14,263 | Great Britain | 1887 |
| 19,032 | Australia | Nov. 25, 1935 |
| 330,610 | Germany | Dec. 18, 1920 |
| 343,583 | Great Britain | 1931 |
| 429,171 | Great Britain | May 27, 1935 |